United States Patent [19]

Young

[11] 4,154,451
[45] May 15, 1979

[54] CONTROL WHEEL

[75] Inventor: Hartley F. Young, Melbourne, Australia

[73] Assignee: Ralph McKay Limited, Victoria, Australia

[21] Appl. No.: 863,697

[22] Filed: Dec. 23, 1977

[51] Int. Cl.² .............................................. B62D 13/04
[52] U.S. Cl. ...................................... 280/86; 172/311; 172/386; 280/411 R
[58] Field of Search ........... 280/411 R, 411 A, 411 C, 280/412, 413, 86; 16/19; 172/386, 383, 282, 311, 456, 310, 314, 603

[56] References Cited

U.S. PATENT DOCUMENTS

| 657,862 | 9/1900 | Davis | 172/386 |
| 2,340,495 | 2/1944 | Strandlund | 172/386 |
| 3,276,788 | 10/1966 | Sackler et al. | 16/19 X |

Primary Examiner—John A. Pekar
Attorney, Agent, or Firm—Buell, Blenko & Ziesenheim

[57] ABSTRACT

A control wheel for an agricultural machine of the folding type in which the wings fold to trail behind a central section. The control wheel comprises a castor wheel coupled with tensioning devices which enable the wheel to track normally while folding or unfolding but to align itself in the direction of travel when folding is completed.

2 Claims, 12 Drawing Figures

CONTROL WHEEL

This invention relates to control wheels for trailing vehicles or machines which are at times required to be turned so that the trailer vehicle axis turns through a 90° angle while the towing vehicle moves in a straightline. In particular in folding machinery where the machine normally extends transversely at right angles to the towing vehicle and when folded extends along the direction of travel of the towing vehicle, a reliable control wheel is needed. The control wheel is generally located in a position most remote from the towing linkage.

Problems which are sometimes associated with control wheels in trailing machines is that the wheel turns in the wrong direction due to irregularities in the ground surface or does not track but is pushed or dragged and does not steer the trailer into the correct position.

One type control wheel which has been proposed is a simple castor wheel. This wheel behaves correctly when the trailer is being manouvered into position by the towing vehicle moving forward in a straight line. However, when the trailing machine is being trailed with its length in line with the towing vehicle's direction of travel the castor wheel's movement is erratic. Also where the trailing machine is being manouvered into position by reversing the towing vehicle the castor wheel does not necessarily move in the correct direction of travel but can be erratic. Also once the trailing machine is pushed into its transverse position by the reverse movement of the towing vehicle the control castor wheel may not swivel into the aligned position but rather may be retained in a transverse position and be dragged or pushed.

An alternate proposal in which a fixed wheel is used works well when the trailing machine is being towed or when the trailing machine is being manouvered from a transverse to an inline position. If the trailing machine is being towed forwardly while in its transverse orientation the control wheel is raised out of contact with the ground. However, the fixed wheel is difficult to control during movement from an inline position to a transverse position which is usually achieved by reversing the towing vehicle. In manouvres of this kind the wheel tends to drag rather than roll.

Thus it is an object of this invention to provide a control wheel which allows a trailing vehicle to be moved to and from a position in line with the towing vehicle to a position at right angles to the towing vehicle by simply moving the towing vehicle forward or backwards without causing damage to the tyre of the control wheel.

To this end the present invention provides a control wheel for a trailing vehicle including angle control means which maintains a set angle for said wheel and which angle control means is responsive to drag force from said wheel when it is in a position transverse to the direction of travel of said trailing vehicle, to allow said wheel to align with the direction of travel of said vehicle. In more details this invention includes a castor wheel and said angle control means comprises a first spring device tensioned to set said wheel at an initial angle and a second spring device acting in a direction opposite to said first device said second spring device having a tension less than that applied as drag force to the control wheel when it is aligned in a position transverse to the trailing vehicles direction of travel.

Preferably this invention provides a control wheel for a trailing vehicle which includes locking means for maintaining the wheel in a fixed position when the trailing vehicle is being towed and angle control means for use when the trailing vehicle is being manouvered to a position transverse to the towing vehicle, said angle control means including a device adapted to urge the control wheel into a position slightly out of alignment with the direction of travel of the wheel when the trailing vehicle is moving into a transverse position, said device also being adapted to allow said control wheel to assume a position in line with the direction of travel of the towing vehicle when the trailing vehicle has assumed a position transverse to the towing vehicle.

According to the invention the control wheel may be a castor wheel having a locking pin for fixing the position of the wheel and means which can be activated to bias the wheel slightly out of alignment with the direction of travel of the wheel. This biasing device can either have a tension limit beyond which it ceases to operate so that the wheel simply castors into the correct alignment. Alternatively, a separate biasing device can be connected to the wheel which only becomes effective when the wheel is at a large angle (within the vicinity of 90°) to the direction of travel and which brings the wheel into alignment with the direction of travel.

A preferred embodiment of the invention will now be described.

The drawings illustrate in FIGS. 1 to 4 a schematic representation of the steps of unfolding an agricultural machine which includes a central portion and two wing portions which pivot to fold behind the centre section in line with the towing vehicle. Only one wing of the machine is illustrated.

This invention relates to a control wheel on a wing section of a folding machine and the position of the pivot point of the wing section on the centre section does not affect its operation.

Figure 1:
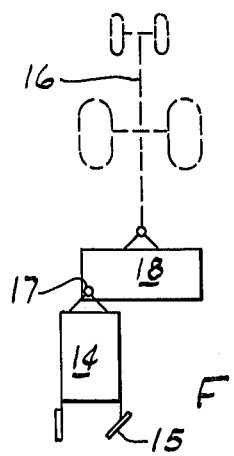

In FIG. 1 the wing section 14 is in its trailing position but is in readiness to be unfolded. The control wheel 15 is set at a small angle to the line parallel to the axis of the towing vehicle 16. As the towing vehicle 16 is reversed the wing section 14 will pivot about connection point 17 on the centre section 18 of the folding machine.

Figure 2:
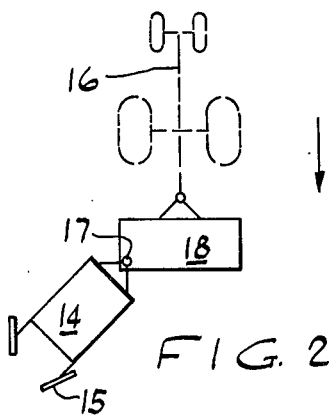

In FIG. 2 the unfolding movement has begun and the wing section 14 has rotated about point 17. The control wheel 15 has maintained its initial set angle and ensures that as the towing vehicle reverses the wing section 14 swings outward.

Figure 3:
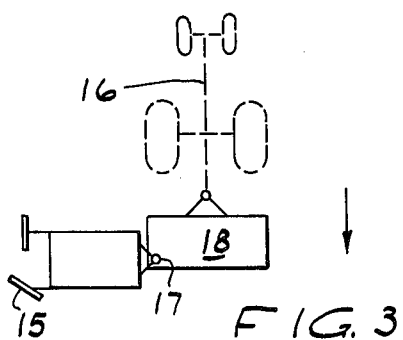
Figure 4:
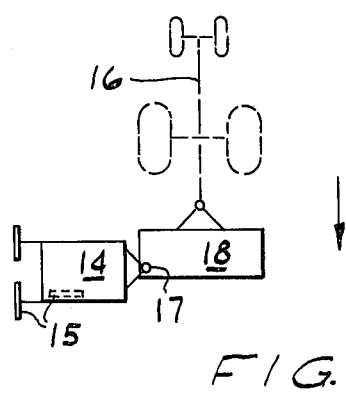
Figure 8:
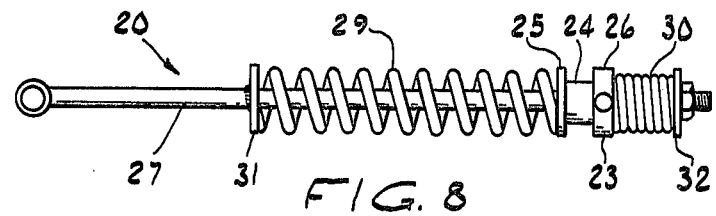
FIG. 8 illustrates the biasing control arm and FIGS. 9 to 11 illustrate in plan views the various operating positions of the biasing control arm and the control wheel of this invention.

In FIG. 3 the unfolding is completed and the wing section 14 is in line with the centre section 18 in its operating position. The control wheel 15 still maintains its initial set angle. However, as the towing vehicle 16 continues to reverse the control wheel 15 swivels about to align itself with the direction of travel as shown in FIG. 4.

At this point the wing section is secured into its unfolded operating position and control wheel 15 is folded up out of ground contact.

Figure 5:
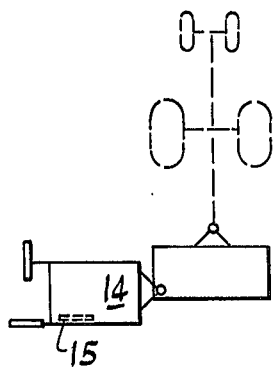
FIGS. 5 to 7 illustrate the sequence of operations to fold the wing section from its operational (unfolded) position to its trailing (folded position).
Figure 6:
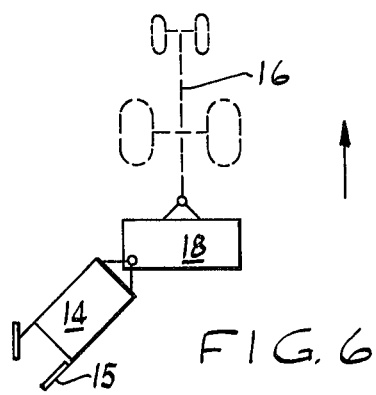
Figure 7:
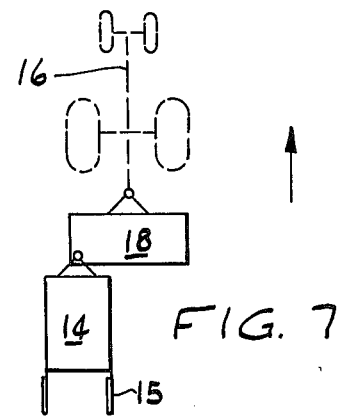

When the machine is to be towed along highways and is to be folded the wing section 14 is unsecured and the control wheel 15 is lowered into ground contact as in FIG. 5. The towing vehicle is then driven forward and the wing section 14 is pulled into its natural trailing position behind the centre section 18. During the initial forward movement of the towing vehicle 16 the control wheel 15 acts as a simple castor wheel and this is shown in FIG. 6 while FIG. 7 schematically illustrates the position of the wing section 14 in the trailing position. When the machine is towed in the folded position the control wheel is locked into position in alignment with the direction of travel of the towing vehicle.

The control wheel and its components are shown in FIGS. 8 to 12. The wheel 15 is basically a castor wheel with a biasing control arm 20 shown generally in FIG. 8, to maintain the wheel in a set inclination during unfolding. The pivot shaft 21 of the castor wheel 15 is connected by arm 22 to a trunnion 23 on biasing control arm 20.

The trunnion 23 consists of a tube 24 slidably mounted on rod 27 and includes two flanges 25 and 26.

Springs 29 and 30 are mounted on rod 27 and are each fixed at ends 31 and 32 onto rod 27.

The rod 27 is pivotally connected at 33 to the machine frame 34. The springs 29 and 30 abut flanges 25 and 26 and expand or compress as trunnion 23 slides along rod 27.

Figure 10:
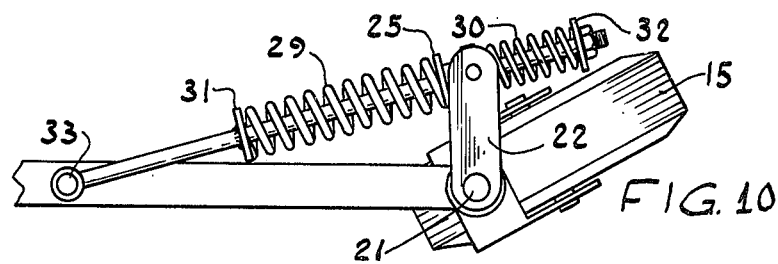

Spring 30 is tensioned to give an initial set angle to the castor wheel 15 as shown in FIG. 10. This is the arrangement of the control wheel mechanism when the wing section is being unfolded as shown in FIGS. 1 to 3.

Figure 11:
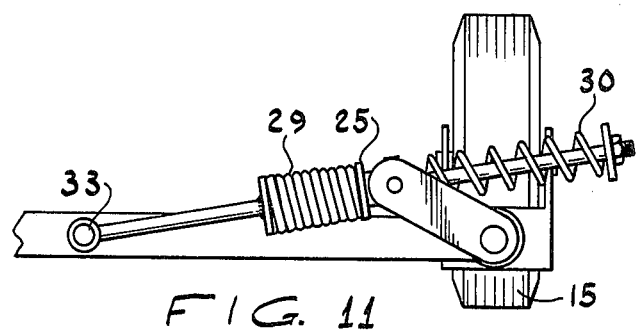

FIG. 11 illustrates the arrangement of the control wheel mechanism when the control wheel is in the position shown in FIG. 4. The drag force on the control wheel 15 overcomes the tension of check spring 29 and the wheel 15 castors into alignment with the direction of travel of the towing vehicle.

Figure 9:
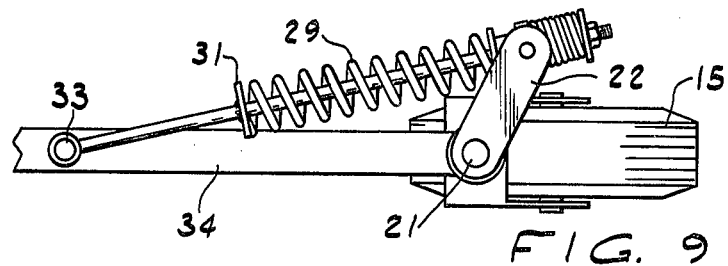

FIG. 9 illustrates the control wheel arrangement when it is fixed into position for when the wing section is folded and is in its trailing position as shown in FIG. 7.

Figure 12:
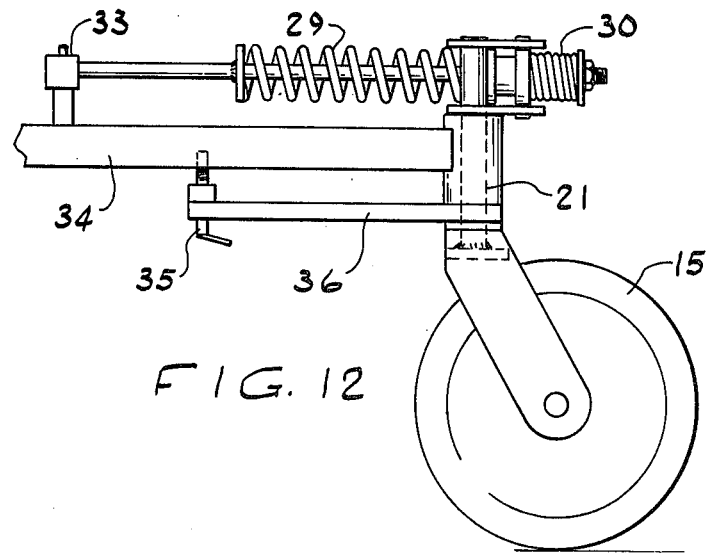
FIG. 12 is a side view of the control wheel and the biasing control arm.

Securing pin 35 secures the arm 36 of the castor wheel support to machine frame 34 and thus locks the castor wheel into alignment with the towing vehicle when the wing section 4 is in its folded trailing position FIGS. 7, 9 and 12.

The control wheel of this invention can include means enabling it to be raised above ground contact when the trailing machine is being used for agricultural work.

Without a control wheel as provided by this invention folding agricultural machines or other trailers cannot be manouvered effectively unless the ground surface is smooth and flat. On a smooth flat surface a castor wheel may be effective to carry out the unfolding manouvre but any unevenness in the ground surface causes the castor wheel to change its orientation and manouvering becomes difficult, if not impossible. By maintaining an adequate tension on the wheel during unfolding a satisfactory result is obtained.

I claim:

1. A trailing vehicle including a frame and a control wheel, said control wheel comprising in combination a castor axis shaft mounted on said frame, a wheel mounted on said castor axis shaft, an arm fixed to and extending from said castor axis shaft, and angle control means mounted on said frame, said angle control means comprising a movable block connected between two opposed springs wherein said arm is pivotally connected to said movable block and one of said springs being biased in a direction opposed to the drag force applicable to said wheel and the force applied by said one spring being less than the maximum drag force applicable to said wheel.

2. A trailing vehicle as claimed in claim 1 wherein said angle control means consists of a rod pivotally connected to said frame, said rod having two flanged stops spaced apart on said rod and said two springs each abutting one of said two stops and said movable block being slidably mounted on said rod.

* * * * *

UNITED STATES PATENT AND TRADEMARK OFFICE
CERTIFICATE OF CORRECTION

PATENT NO. : 4,154,451
DATED : May 15, 1979
INVENTOR(S) : Hartley F. Young

It is certified that error appears in the above-identified patent and that said Letters Patent are hereby corrected as shown below:

Column 4, line 6, "wing section 4" should be --wing section 14--.

Signed and Sealed this

Twenty-fifth Day of September 1979

[SEAL]

Attest:

Attesting Officer

LUTRELLE F. PARKER
Acting Commissioner of Patents and Trademarks